US012661981B2

(12) United States Patent
Kim et al.

(10) Patent No.: US 12,661,981 B2
(45) Date of Patent: Jun. 23, 2026

(54) METHOD AND DEVICE FOR REMOTELY CONTROLLING IGNITION OF AGRICULTURAL MACHINE

(71) Applicant: GINT CO., LTD., Gyeonggi-do (KR)

(72) Inventors: Yong Hyeon Kim, Gyeonggi-do (KR); Seung Rak Son, Gyeonggi-do (KR); Jae Ho Song, Gyeonggi-do (KR); Dae Hyun Kim, Seoul (KR)

(73) Assignee: GINT CO., LTD., Gyeonggi-do (KR)

( * ) Notice: Subject to any disclaimer, the term of this patent is extended or adjusted under 35 U.S.C. 154(b) by 414 days.

(21) Appl. No.: 18/318,067

(22) Filed: May 16, 2023

(65) Prior Publication Data

US 2023/0286381 A1 Sep. 14, 2023

Related U.S. Application Data

(63) Continuation of application No. PCT/KR2021/011199, filed on Aug. 23, 2021.

(30) Foreign Application Priority Data

Nov. 16, 2020 (KR) ........................ 10-2020-0152717

(51) Int. Cl.
*B60K 28/04* (2006.01)
*B60K 28/02* (2006.01)
(Continued)

(52) U.S. Cl.
CPC .............. *B60K 28/10* (2013.01); *B60K 28/02* (2013.01); *G07C 5/008* (2013.01)

(58) Field of Classification Search
CPC ........ B60K 28/10; B60K 28/02; B60K 28/04; B60K 28/063; B60K 28/12; G07C 5/008;
(Continued)

(56) References Cited

U.S. PATENT DOCUMENTS 5,990,785 A * 11/1999 Suda ..................... B60R 25/043
340/426.21
11,236,718 B1 * 2/2022 Lee ......................... F02N 15/06
(Continued)

FOREIGN PATENT DOCUMENTS

JP 2006249919 A 9/2006
JP 2011051458 A 3/2011
(Continued)

OTHER PUBLICATIONS

International Search Report issued in corresponding International Application No. PCT/KR2021/011199, mailed Dec. 14, 2021, 4 pages.

*Primary Examiner* — Jelani A Smith
*Assistant Examiner* — George A Alcorn, III
(74) *Attorney, Agent, or Firm* — Burris Law, PLLC

(57) ABSTRACT

The present invention relates to a method and device for remotely controlling the ignition of an agricultural machine to switch on or off. Specifically, the present invention relates to a method and device for controlling the ignition of an agricultural machine to switch on in response to a remote ignition request by a user of the agricultural machine to the agricultural machine, and automatically switch off when at least one of a plurality of preset ignition stopping conditions is satisfied after the ignition of the agricultural machine is controlled to switch on.

7 Claims, 2 Drawing Sheets

(51) Int. Cl.

| | |
|---|---|
| *B60K 28/10* | (2006.01) |
| *B60K 28/12* | (2006.01) |
| *G06Q 10/20* | (2023.01) |
| *G06Q 30/016* | (2023.01) |
| *G06Q 30/0203* | (2023.01) |
| *G06Q 50/02* | (2024.01) |
| *G06Q 50/40* | (2024.01) |
| *G07C 5/00* | (2006.01) |
| *H04W 4/021* | (2018.01) |

(58) Field of Classification Search
CPC ........... B60W 2300/152; G06Q 10/20; G06Q 30/016; G06Q 30/0203; G06Q 50/02; G06Q 50/40; G08B 25/016; H04W 4/021
USPC ......................................................... 701/50
See application file for complete search history.

(56) References Cited

U.S. PATENT DOCUMENTS

| | | | |
|---|---|---|---|
| 2011/0295486 A1* | 12/2011 | Guensler ................. | F02D 41/08 |
| | | | 701/102 |
| 2017/0107925 A1* | 4/2017 | Sutton ................. | F02N 11/0803 |
| 2017/0226947 A1* | 8/2017 | Kawakami ........ | B60W 50/0097 |
| 2019/0112991 A1* | 4/2019 | Dudar .................... | F02D 13/06 |
| 2019/0338743 A1* | 11/2019 | Gopalakrishnan ........................... | |
| | | | F02N 11/0851 |
| 2020/0378319 A1* | 12/2020 | Makkiya ............ | F02N 11/0837 |

FOREIGN PATENT DOCUMENTS

| | | | | |
|---|---|---|---|---|
| KR | 101251531 B1 | 4/2013 | | |
| KR | 20160056714 A | * 5/2016 | ........... | B60R 25/102 |
| KR | 1020160056714 A | 5/2016 | | |
| KR | 1020170079246 A | 7/2017 | | |
| KR | 101798526 B1 | 12/2017 | | |

* cited by examiner

[Fig. 1]
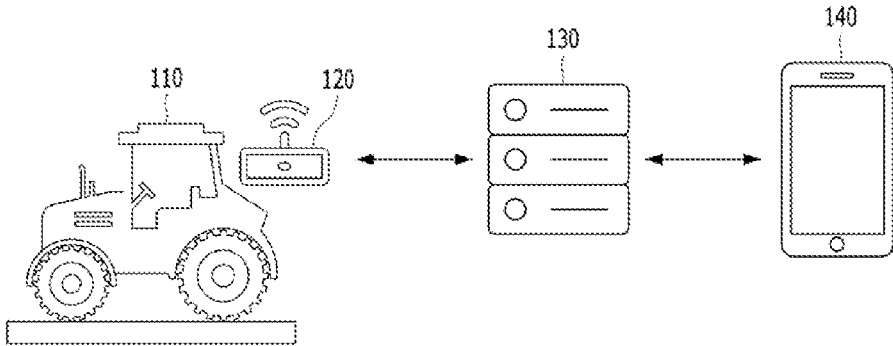
[Fig. 2]
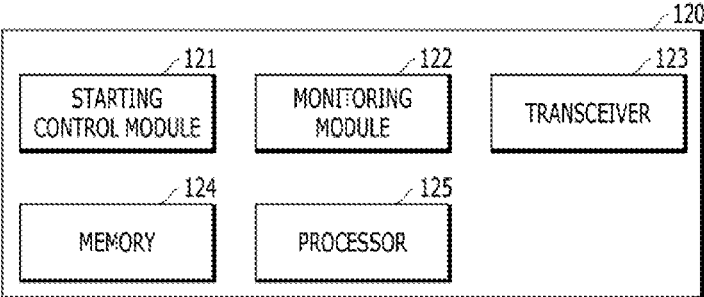

[Fig. 3]
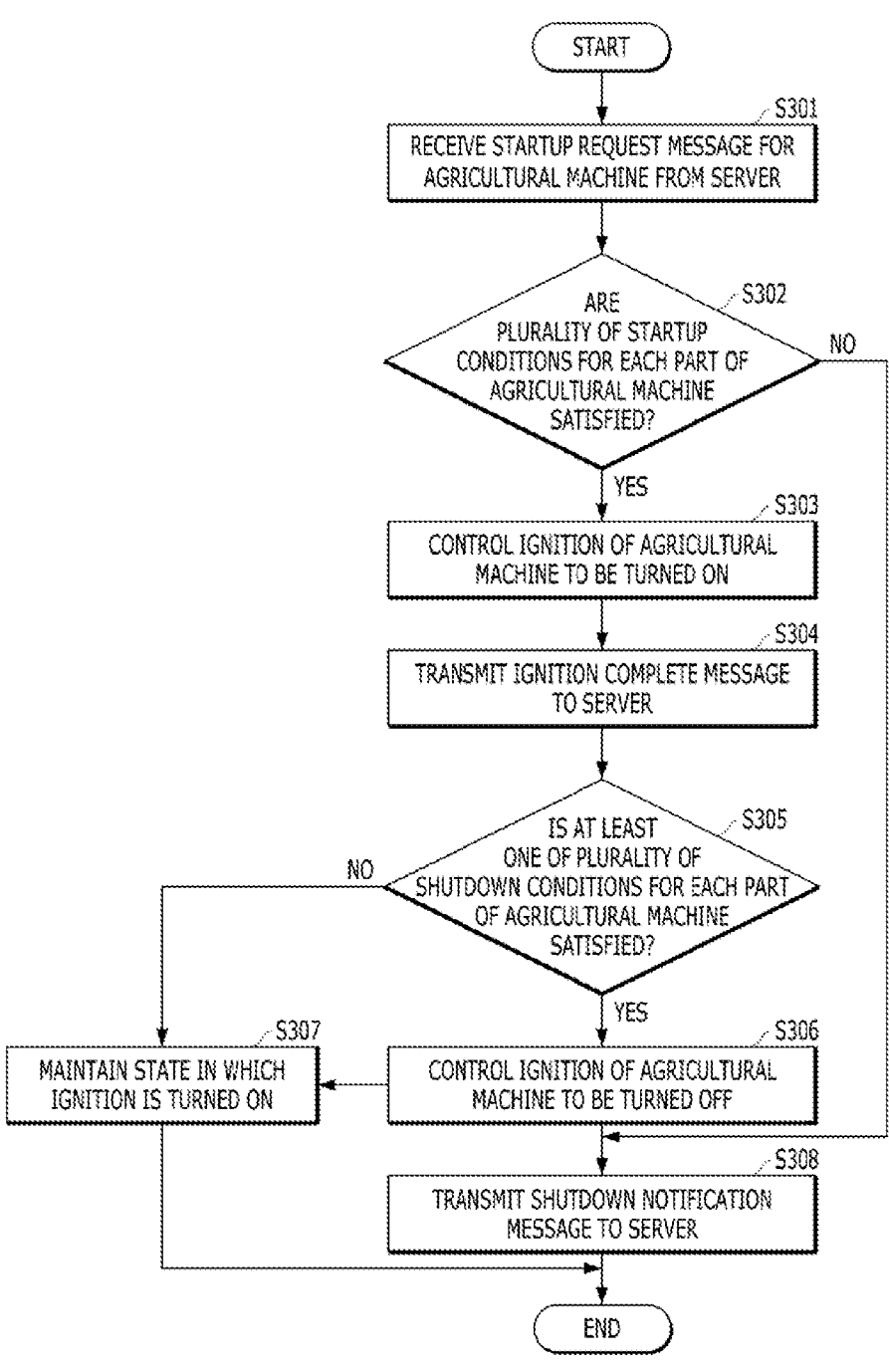

METHOD AND DEVICE FOR REMOTELY CONTROLLING IGNITION OF AGRICULTURAL MACHINE

CROSS-REFERENCE TO RELATED APPLICATIONS

This application is a continuation of International Application No. PCT/KR2021/011199, filed on Aug. 23, 2021, which claims priority to and the benefit of Korean Patent Application No. 10-2020-0152717 filed on Nov. 16, 2020. The disclosures of the above applications are incorporated herein by reference.

FIELD

The present disclosure relates to a method and device apparatus for remotely controlling an ignition of an agricultural machine to be turned on or off. Specifically, the present invention relates to a method and device for controlling an ignition of an agricultural machine to be turned on when a plurality of startup conditions are satisfied in response to a request for remote startup of an agricultural machine from a user of the agricultural machine and automatically controlling the ignition to be turned off when at least one of a plurality of preset shutdown conditions is satisfied after the ignition of the agricultural machine has been controlled to be turned on.

BACKGROUND

The statements in this section merely provide background information related to the present disclosure and may not constitute prior art.

Agricultural machines are treated as very important factors to reduce high labor burdens and production costs in response to lack of labor according to a decrease in working population and aging of workers in farming areas. The agricultural machines are to perform various kinds of work required for farming, and various kinds of work such as plow, rotary, pest control, and transplanting work are performed by agricultural machines. The agricultural machines are divided into walk-type work machines of which workers walk with the agricultural machines and operate the agricultural machines and riding work machines of which workers operate the agricultural machines while riding in driver's seats provided on the agricultural machines.

Recently, with the development of wireless communication technology, telematics devices which may be electrically coupled to agricultural machines and perform wireless communication of agricultural machine-related information with servers of agricultural machine manufacturers and the like have become popular. When the telematics devices are used, users can control operations of the agricultural machines even without directly going to the agricultural machines. In particular, when an ignition of the agricultural machine is remotely controlled, since a preheating time can be reduced, the user can efficiently use time.

When the ignition of the agricultural machine is controlled to be turned on, and whether startup conditions are satisfied is checked using the telematics device electrically coupled to the agricultural machine, convenience and safety can be provided to the user of the agricultural machine.

A case in which, even when the ignition has been controlled to be turned on because the conditions for ignition of the agricultural machine are satisfied, the driver does not ride in the agricultural machine for a certain period of time, cases in which certain conditions for safety are not satisfied after the ignition of the agricultural machine has been controlled to be turned on may occur. Such conditions cannot recognize at a time at which the ignition of the agricultural machine is initially controlled to be turned on. Accordingly, even when the startup conditions have been satisfied and the ignition of the agricultural machine has been controlled to be turned on, in a case in which a shutdown condition is satisfied, it is preferable to automatically control the ignition of the agricultural machine to be turned off for safety rather than maintaining a state in which the ignition of the agricultural machine is turned on.

Accordingly, a method and device for remotely controlling an ignition of an agricultural machine to be turned on or off are required.

SUMMARY

This section provides a general summary of the disclosure and is not a comprehensive disclosure of its full scope or all of its features.

Technical Problem

Various embodiments of the present invention are directed to providing a method and device for remotely controlling an ignition of an agricultural machine to be turned on or off.

In addition, various embodiments of the present invention are directed to providing a method and device for controlling an ignition of an agricultural machine to be turned on when a plurality of startup conditions are satisfied in response to a request for remote startup of an agricultural machine from a user of the agricultural machine and automatically controlling the ignition to be turned off when at least one of a plurality of preset shutdown conditions is satisfied after the ignition of the agricultural machine has been controlled to be turned on.

Technical Solution

One aspect of the present invention provides a method of operating an electronic device. The electronic device is coupled to an agricultural machine and includes a starting control module configured to control an ignition of the agricultural machine to be turned on or off, a monitoring module configured to monitor a state of each part of the agricultural machine, a transceiver, a memory, and a processor. The method of operating the electronic device includes receiving a startup request message for an agricultural machine from a server, monitoring whether a plurality of preset startup conditions for each part of the agricultural machine are satisfied, controlling an ignition of the agricultural machine to be turned on when all the plurality of startup conditions are satisfied, transmitting an startup completion message to the server, monitoring whether at least one of a plurality of predetermined shutdown conditions for each part of the agricultural machine is satisfied, controlling the ignition of the agricultural machine to be turned off when the at least one of the plurality of preset shutdown conditions is satisfied, and transmitting a shutdown notification message to the server.

In addition, another aspect of the present invention provides an electronic device coupled to an agricultural machine. The electronic device includes a starting control module configured to control an ignition of the agricultural machine to be turned on or off, a monitoring module configured to monitor a state of each part in the agricultural machine, a transceiver, a memory, and a processor, and the processor is configured to perform the method of operating the electronic device according to various embodiments of the present invention.

In addition, still another aspect of the present invention provides a computer program. When the computer program is executed by at least one processor, the computer program is executed to perform the method of operating the electronic device according to the various embodiments of the present invention using the at least one processor and is written in a computer readable storage medium.

Advantageous Effects

Various embodiments of the present invention can provide a method and device for remotely controlling an ignition of an agricultural machine to be turned on or off.

In addition, various embodiments of the present invention can provide a method and device for controlling an ignition of an agricultural machine to be turned on when a plurality of startup conditions are satisfied in response to a request for remote startup of an agricultural machine from a user of the agricultural machine and automatically controlling the ignition to be turned off when at least one of a plurality of preset shutdown conditions is satisfied after the ignition of the agricultural machine has been controlled to be turned on.

Effects that can be obtained from the present invention are not limited to the effects described above, and other effects which are not described will be clearly understood by those skilled in the art from the following description.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which:

FIG. 1 is a view illustrating a configuration of a communication system according to various embodiments of the present invention;

FIG. 2 is a view illustrating a configuration of an electronic device according to various embodiments of the present invention; and FIG. 3 is a view illustrating an operation process of an electronic device according to various embodiments of the present invention.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

Modes of the Invention

The terminology used herein is for the purpose of describing particular embodiments only and is not intended to limit the scope of any other embodiments. The singular forms are intended to include the plural forms unless the context clearly indicates otherwise. Terms including technical and scientific terms used herein have meanings that are the same as meanings generally understood by those skilled in the art. Terms, such as those defined in commonly used dictionaries, may be interpreted as having meanings that are consistent with or similar to their meanings in the context of the relevant art and will not be interpreted in idealized or overly formal senses unless expressly so defined here. In some cases, even terms defined in the present specification should not be interpreted to exclude embodiments of the present specification.

FIG. 1 is a view illustrating a configuration of a communication system according to various embodiments of the present invention.

Referring to FIG. 1, the communication system according to the various embodiments of the present invention includes an agricultural machine 110, an electronic device 120, a server 130, and a user terminal 140.

The agricultural machine 110 is a riding work machine which is operated by a worker while the work is seated in a driver's seat provided in the agricultural machine and corresponds to a tractor, a riding transplanting machine, or a combine. The agricultural machine 110 is typically operated while a user rides in the agricultural machine. When the user remotely controls ignition of the agricultural machine 110 using a telematics device, the user may reduce a preheating time to be taken after the user rides in the agricultural machine 110 and directly controls ignition.

The electronic device 120 is a telematics device which may be physically and also electrically coupled to the agricultural machine. The telematics device is a device which provides a driver with various types of information required for driving in real time through a wireless network. The electronic device 120 according to the various embodiments of the present invention is coupled to the agricultural machine, and the electronic device 120 includes a starting control module configured to control an ignition of the agricultural machine 110 to be turned on or off, a monitoring module configured to monitor a state of each part in the agricultural machine 110, a transceiver, a memory, and a processor. The electronic device 120 may receive a startup request message transmitted from the user terminal 140 through the server 130. After receiving the startup request message, the electronic device 120 may monitor a state of the agricultural machine 110 using the monitoring module to determine whether the ignition is in a state in which the ignition may be controlled to be turned on. After monitoring, the electronic device 120 may control the ignition of the agricultural machine 110 to be turned on using the starting control module. The electronic device 120 may monitor a state of the agricultural machine 110 using the monitoring module to determine whether the ignition of the agricultural machine 110 may be controlled to be turned off even after the ignition of the agricultural machine 110 has been controlled to be turned on. According to a result of the monitoring, the electronic device 120 may control the ignition of the agricultural machine 110 to be turned off using the starting control module.

The server 130 is a server which provides information related to an operation of the agricultural machine 110. According to the various embodiments of the present invention, the server 130 may be operated by a manufacturer of the agricultural machine 110, a manufacturer of the electronic device 120, or an agricultural machine operation information service provider. The server 130 may transmit information to the electronic device 120 and also receive information from the electronic device 120 through wireless communication. In addition, the server 130 may transmit information to the user terminal 140 and also receive information from the user terminal 140 through wireless communication. When the server 130 receives a startup request message, which requests to control the ignition of the agricultural machine 110 to be turned on, from the user terminal 140, the server 130 may transmit the startup request message to the electronic device 120. When the server 130 receives an ignition completion message from the electronic device 120, the server 130 may transmit the ignition completion message to the user terminal 140. When the server 130 receives a shutdown notification message from the electronic device 120, the server 130 may transmit the shutdown notification message to the user terminal 140.

The user terminal 140 is a terminal operated by the user of the agricultural machine 110. The user terminal 140 is an electronic device capable of performing wired/wireless communication with the server 130. The user terminal 140 may be an electronic device, such as a personal computer, a cellular phone, a smart phone, and a tablet computer, including a memory capable of storing information, a transceiver capable of transmitting and receiving information, and at least one processor capable of performing an operation of information. The user terminal 140 may transmit, to the server 130, the startup request message of a request for controlling the ignition of the agricultural machine 110 to be turned on. The user terminal 140 may receive information on whether the ignition of the agricultural machine 110 has been controlled to be turned on or off from the server 130.

FIG. 2 is a view illustrating a configuration of an electronic device according to various embodiments of the present invention.

Referring to FIG. 2, an electronic device 120 according to the various embodiments of the present invention includes a starting control module 121, a monitoring module 122, a transceiver 123, a memory 124, and a processor 125.

The electronic device 120 is a terminal device capable of controlling an ignition of an agricultural machine to be turned on when a plurality of startup conditions are satisfied in response to a request for remote startup of the agricultural machine from a user of the agricultural machine and capable of automatically controlling the ignition to be turned off when at least one of a plurality of preset shutdown conditions is satisfied after the ignition of the agricultural machine has been controlled to be turned on. The electronic device 120 may be a telematics device which may be physically/electrically coupled to the agricultural machine and may be an electronic device including a memory capable of storing information, a transceiver capable of transmitting and receiving information, and at least one processor capable of performing computation of information.

The starting control module 121 is electrically connected to a starting device of the agricultural machine and is configured to control the starting device of the agricultural machine to be turned on or off. The starting control module 121 operates based on control of the processor 125. The starting control module 121 operates according to the control of the processor 125 in the electronic device 120, and the starting control module 121 controls the starting device of the agricultural machine to be turned on or off according to the control of the processor 125.

The monitoring module 122 is electrically connected to each part of the agricultural machine and is configured to monitor a state of each part of the agricultural machine. For example, the monitoring module 122 may monitor whether a door of the agricultural machine is locked, whether an amount of brake oil of the agricultural machine is sufficient, whether air pressure of the agricultural machine is appropriate, whether a power take off (PTO) is turned off, revolutions per minute (RPM) after ignition of the agricultural machine is controlled, whether the user is seated in a driver's seat of the agricultural machine, whether a bonnet of the agricultural machine is opened, and the like. A result of the monitoring performed by the monitoring module 122 is transmitted to the processor 125, and the processor 125 determines whether the ignition of the agricultural machine is to be turned on or off based on the result of the monitoring.

The transceiver 123 is connected to the processor 125 and transmits and/or receives a signal. All or a part of the transceiver 123 may be a transmitter, a receiver, or a transceiver. The transceiver 123 may support at least one of various wireless communication standards such as an institute of electrical and electronics engineers (IEEE) 802.xx system, an IEEE Wi-Fi system, a 3rd generation partnership project (3GPP) system, a 3GPP long term evolution (LTE) system, a 3GPP 5G new radio (NR) system, a 3GPP2 system, and Bluetooth.

The memory 124 may be connected to the transceiver 123 and store information and the like received through communication. In addition, the memory 124 may be connected to the processor 125 and store data such as basic programs for an operation of the processor, application programs, setting information, and information generated due to the operation of the processor 125. The memory 124 may be composed of a volatile memory, a nonvolatile memory, or a combination of a volatile memory and a nonvolatile memory. The memory 124 may provide stored data according to a request of the processor 125.

The processor 125 may be configured to implement procedures and/or methods proposed in the present invention. The processor 125 controls an overall operation of the electronic device 120 for remotely controlling the ignition of the agricultural machine to be turned on/off. For example, the processor 125 transmits or receives information using the transceiver 123. In addition, the processor 125 writes and reads data on and from the memory 124. The processor 125 may include at least one processor.

FIG. 3 is a view illustrating an operation process of an electronic device according to various embodiments of the present invention. In an embodiment of FIG. 3, the electronic device is coupled to an agricultural machine, and the electronic device includes a starting control module configured to control an ignition of the agricultural machine to be turned on or off, a monitoring module configured to monitor a state of each part in the agricultural machine, a transceiver, a memory, and a processor.

Referring to FIG. 3, in operation S301, the electronic device receives a startup request message for the agricultural machine from a server.

In operation S302, the electronic device monitors whether a plurality of preset startup conditions are satisfied for each part of the agricultural machine. The electronic device may store the plurality of preset startup conditions in the memory. The electronic device may monitor a state of each part of the agricultural machine using the monitoring module electrically connected to each part of the agricultural machine.

As a result of the monitoring in operation S302, when at least one of the plurality of startup conditions is not satisfied, the electronic device proceeds to operation S308 and transmits a shutdown notification message to the server. After receiving the shutdown notification message from the electronic device, the server may transmit the shutdown notification message to a user terminal. The user terminal may check that remote startup has not been successfully performed and at least one of the plurality of startup conditions in the agricultural machine has not been satisfied when receiving the shutdown notification message after transmitting the startup request message.

According to the various embodiments of the present invention, the plurality of preset startup conditions may include at least one of a condition in which a door of the agricultural machine is locked, a condition in which an amount of brake oil of the agricultural machine is sufficient, a condition in which air pressure of the agricultural machine is appropriate, and a condition in which a PTO of the agricultural machine is turned off. Whether the door of the agricultural machine is locked is required for security. Whether the amount of brake oil of the agricultural machine is sufficient, whether the air pressure in the agricultural machine is adequate, and whether the PTO of the agricultural machine is turned off are required for safety. The PTO is a power take-off device installed to use power of an engine of the agricultural machine for other purposes regardless of driving of the agricultural machine driving and configured to output the power by sliding an idle gear on a countershaft of a transmission. For the sake of safety, the ignition of the agricultural machine may be controlled to be turned on in a state in which the PTO is turned off.

In operation S303, when all the plurality of startup conditions are satisfied, the electronic device controls the ignition of the agricultural machine to be turned on. The electronic device may control a starting device of the agricultural machine to be turned on or off using the starting control module electrically connected to the starting device of the agricultural machine.

According to the various embodiments of the present invention, in operation S303, the electronic device may transmit a monitoring message including a monitoring result for each part of the agricultural machine to the server, receive, from the server, a monitoring response message indicating that all the plurality of startup conditions are satisfied based on the monitoring result, and control the ignition of the agricultural machine to be turned on in response to the monitoring response message.

In operation S304, the electronic device transmits an ignition completion message to the server. After receiving the ignition completion message from the electronic device, the server may transmit the ignition completion message to the user terminal. The user terminal may check that remote startup has been successfully performed when receiving the ignition completion message after transmitting the startup request message.

In operation S305, the electronic device monitors whether at least one of a plurality of preset shutdown conditions is satisfied for each part of the agricultural machine. The electronic device may store the plurality of predetermined shutdown conditions in the memory. The electronic device may monitor a state of each part of the agricultural machine using the monitoring module electrically connected to each part of the agricultural machine.

According to the various embodiments of the present invention, the plurality of shutdown conditions may include at least one of a condition in which an RPM of an engine of the agricultural machine does not exceed a predetermined RPM within a predetermined time period after the ignition has been controlled to be turned on, a condition in which a temperature of the engine does not exceed a predetermined temperature within a predetermined time period after the ignition has been controlled to be turned on, a condition in which a person is not seated in a driver's seat within a predetermined time period after the ignition has been controlled to be turned on, and when a bonnet of the agricultural machine is opened in a state in which a person is not seated in the driver's seat after the ignition has been controlled to be turned on. According to one embodiment, a predetermined RPM may be set to 800 RPM. Since a state in which the RPM of the engine of the agricultural machine does not exceed a predetermined RPM, for example, 800 RPM, within a predetermined time period after the ignition has been controlled to be turned on means that the engine does not operate properly after turning on, the ignition may be controlled to be turned off for safety. Since a state in which a temperature of the engine does not exceed a predetermined temperature within a predetermined time period after the ignition has been controlled to be turned on means that the engine does not operate properly or a temperature sensor does not operate properly after the ignition has been turned on, the ignition may be controlled to be turned off for safety. After the ignition has been controlled to be turned on, when a state in which a person is not seated in the driver's seat continues, since there is a risk of a critical accident, the ignition may be controlled to be turned off when a person is not seated in the driver's seat within a predetermined time period after the ignition has been controlled to be turned on. When a bonnet of the agricultural machine is opened in a state in which a person is not seated in the driver's seat after the ignition has been controlled to be turned on, since there is a possibility that the bonnet is opened by a person who does not know that the agricultural machine has been brought into a repair shop and the ignition has been controlled to be turned on by remote startup control in a state in which there is no occupant, the ignition may be controlled to be turned off for safety.

In operation S306, when at least one of the plurality of preset shutdown conditions is satisfied, the electronic device controls the ignition of the agricultural machine to be turned off. The electronic device may control the starting device of the agricultural machine to be turned on or off using the starting control module electrically connected to the starting device of the agricultural machine.

According to the various embodiments of the present invention, in operation S306, the electronic device may transmit a monitoring message including a monitoring result for each part of the agricultural machine to the server after the ignition of the agricultural machine has been controlled to be turned on, receive a monitoring response message indicating that at least one of the plurality of shutdown conditions is satisfied based on the monitoring result, and control the ignition of the agricultural machine to be turned off in response to the monitoring response message.

In operation S307, when all the preset shutdown conditions are not satisfied, the electronic device maintains a state in which the ignition of the agricultural machine is turned on.

In operation S308, the electronic device transmits the shutdown notification message to the server. After receiving the shutdown notification message from the electronic device, the server may transmit the shutdown notification message to the user terminal. When the user terminal transmits the startup request message, receives the ignition completion message, and receives the shutdown notification message, the user terminal may check that the ignition of the agricultural machine is controlled to be turned off after the ignition has been turned on. That is, the user terminal may check that, although all the plurality of startup conditions of the agricultural machine have been satisfied, at least one of the plurality of shutdown conditions is satisfied after the ignition has been turned on.

According to the various embodiments of the present invention, in addition to the embodiment of FIG. 3, the electronic device may receive an update request message including a plurality of new startup conditions or a plurality of new shutdown conditions from the server and update the plurality of startup conditions or the plurality of shutdown conditions based on the update request message. The user may set the plurality of new startup conditions or the plurality of new shutdown conditions for the agricultural machine using the user terminal. The user terminal may transmit the update request message including the plurality of new startup conditions or the plurality of new shutdown conditions to the server, and the server may transmit the update request message including the plurality of new startup conditions or the plurality of new shutdown conditions to the electronic device. The electronic device may store the received plurality of new startup conditions or the received plurality of new shutdown conditions in the memory.

When embodiments of the present invention are implemented using hardware, application specific integrated circuits (ASICs), digital signal processors (DSPs), digital signal processing devices (DSPDs), programmable logic devices (PLDs), or field programmable gate arrays (FPGAs) configured to perform the present invention may be provided as a processor of the present invention.

Meanwhile, the above-described method may be written as a program that may be executed in a computer, and may be implemented in a general-purpose digital computer that operates the program using a computer readable storage medium. In addition, a structure of data used in the above-described method may be recorded in the computer readable storage medium through several methods. Program storage devices that may be used to describe storage devices including executable computer codes for performing the various methods of the present invention should not be understood to include transitional objects such as carrier waves or signals. The computer readable storage medium includes a storage medium such as a magnetic storage medium (for example, a read-only memory (ROM), floppy disk, or hard disk), an optical reading medium (for example, a compact disc (CD)-ROM or digital optical disc (DVD).

The embodiments described above are those in which the components and features of the present invention are combined in certain forms. Each component or feature should be considered optional unless otherwise expressly stated. Each component or feature may be implemented in a form which is not combined with other components or features. In addition, it is possible to combine some components and/or features to form embodiments of the present invention. The order of operations described in the embodiments of the invention may be changed. Some configurations or features of any embodiment may be included in another embodiment, or may be replaced with corresponding configurations or features of other embodiments. It is apparent that claims that do not have an explicit citation relationship in the claims may be combined to form embodiments or included in new claims by amendment after filing.

It will be apparent to those skilled in the art that the present invention may be realized in other forms without departing from the technical spirit and essential features of the present invention. Accordingly, the above embodiments should be considered as exemplary and should not be considered as limitations. The scope of the present invention should be determined by reasonable interpretation of the appended claims and all possible changes within the equivalent scope of the present invention.

INDUSTRIAL APPLICABILITY

The present invention relates to a method and device for remotely controlling an ignition of an agricultural machine to be turned on or off. Specifically, the present invention relates to a method and device for controlling an ignition of an agricultural machine to be turned on when a plurality of startup conditions are satisfied in response to a request for remote startup of the agricultural machine from a user of the agricultural machine and automatically controlling the ignition of the agricultural machine to be turned off when at least one of a plurality of preset shutdown conditions is satisfied after the ignition of the agricultural machine has been controlled to be turned on.

Unless otherwise expressly indicated herein, all numerical values indicating mechanical/thermal properties, compositional percentages, dimensions and/or tolerances, or other characteristics are to be understood as modified by the word "about" or "approximately" in describing the scope of the present disclosure. This modification is desired for various reasons including industrial practice, material, manufacturing, and assembly tolerances, and testing capability.

As used herein, the phrase at least one of A, B, and C should be construed to mean a logical (A OR B OR C), using a non-exclusive logical OR, and should not be construed to mean "at least one of A, at least one of B, and at least one of C."

In this application, the term "controller" and/or "module" may refer to, be part of, or include: an Application Specific Integrated Circuit (ASIC); a digital, analog, or mixed analog/digital discrete circuit; a digital, analog, or mixed analog/digital integrated circuit; a combinational logic circuit; a field programmable gate array (FPGA); a processor circuit (shared, dedicated, or group) that executes code; a memory circuit (shared, dedicated, or group) that stores code executed by the processor circuit; other suitable hardware components (e.g., op amp circuit integrator as part of the heat flux data module) that provide the described functionality; or a combination of some or all of the above, such as in a system-on-chip.

The term memory is a subset of the term computer-readable medium. The term computer-readable medium, as used herein, does not encompass transitory electrical or electromagnetic signals propagating through a medium (such as on a carrier wave); the term computer-readable medium may therefore be considered tangible and non-transitory. Non-limiting examples of a non-transitory, tangible computer-readable medium are nonvolatile memory circuits (such as a flash memory circuit, an erasable programmable read-only memory circuit, or a mask read-only circuit), volatile memory circuits (such as a static random access memory circuit or a dynamic random access memory circuit), magnetic storage media (such as an analog or digital magnetic tape or a hard disk drive), and optical storage media (such as a CD, a DVD, or a Blu-ray Disc).

The apparatuses and methods described in this application may be partially or fully implemented by a special purpose computer created by configuring a general-purpose computer to execute one or more particular functions embodied in computer programs. The functional blocks, flowchart components, and other elements described above serve as software specifications, which can be translated into the computer programs by the routine work of a skilled technician or programmer.

The description of the disclosure is merely exemplary in nature and, thus, variations that do not depart from the substance of the disclosure are intended to be within the scope of the disclosure. Such variations are not to be regarded as a departure from the spirit and scope of the disclosure.

What is claimed is:

1. A method of operating an electronic device, which is coupled to an agricultural machine and includes a starting control module configured to control an ignition of the agricultural machine to be turned on or off, a monitoring module configured to monitor a state of each part of the agricultural machine, a transceiver, a memory, and a processor, the method comprising:

receiving an update request message including a plurality of new startup conditions and a plurality of new shutdown conditions from a server; and updating the plurality of startup conditions and the plurality of shutdown conditions based on the update request message;

receiving a startup request message for the agricultural machine from the server;

monitoring whether the plurality of updated startup conditions for each part of the agricultural machine are satisfied;

controlling an ignition of the agricultural machine to be turned on when all the plurality of updated startup conditions are satisfied;

transmitting a startup completion message to the server;

monitoring whether at least one of a plurality of updated shutdown conditions for each part of the agricultural machine is satisfied;

controlling the ignition of the agricultural machine to be turned off when the at least one of the plurality of updated shutdown conditions is satisfied; and transmitting a shutdown notification message to the server, wherein the plurality of updated shutdown conditions include:

a first condition in which revolutions per minute (RPM) of an engine of the agricultural machine do not exceed a predetermined RPM within a predetermined time period after the ignition has been controlled to be turned on;

a second condition in which a temperature of the engine does not exceed a predetermined temperature within a predetermined time period after the ignition has been controlled to be turned on; and a third condition in which a person is not seated in a driver's seat within a predetermined time period after the ignition has been controlled to be turned on.

2. The method of claim 1, wherein the controlling of the ignition of the agricultural machine to be turned on when all the plurality of startup conditions are satisfied includes:

transmitting a monitoring message including a monitoring result for each part of the agricultural machine to the server;

receiving, from the server, a monitoring response message indicating that all the plurality of startup conditions are satisfied based on the monitoring result; and controlling the ignition of the agricultural machine to be turned on in response to the monitoring response message.

3. The method of claim 1, wherein the plurality of startup conditions include a condition in which a power take-off (PTO) is turned off.

4. The method of claim 1, wherein, when the at least one of the plurality of shutdown conditions is satisfied, the controlling of the ignition of the agricultural machine to be turned off includes:

transmitting a monitoring message including a monitoring result for each part of the agricultural machine to the server after the ignition of the agricultural machine has been controlled to be turned on;

receiving, from the server, a monitoring response message indicating that the at least one of the plurality of shutdown conditions is satisfied based on the monitoring result; and controlling the ignition of the agricultural machine to be turned off in response to the monitoring response message.

5. The method of claim 1, wherein the plurality of shutdown conditions include a fourth condition in which a bonnet of the agricultural machine is opened in a state in which a person is not seated in a driver's seat after the ignition has been controlled to be turned on.

6. An electronic device coupled to an agricultural machine, the electronic device comprising:

a starting control module configured to control an ignition of the agricultural machine to be turned on or off;

a monitoring module configured to monitor a state of each part in the agricultural machine;

a transceiver;

a memory; and a processor, wherein the processor is configured to:

receive an update request message including a plurality of new startup conditions and a plurality of new shutdown conditions from a server;

update a plurality of startup conditions and a plurality of shutdown conditions stored in the memory based on the update request message;

receive a startup request message for the agricultural machine from the server;

monitor whether a plurality of updated startup conditions for each part of the agricultural machine are satisfied;

control the ignition of the agricultural machine to be turned on when all the plurality of updated startup conditions are satisfied;

transmit an ignition completion message to the server;

monitor whether at least one of a plurality of updated shutdown conditions for each part of the agricultural machine is satisfied;

control the ignition of the agricultural machine to be turned off when at least one of the plurality of updated shutdown conditions is satisfied; and transmit a shutdown notification message to the server, wherein the plurality of updated shutdown conditions include:

a first condition in which revolutions per minute (RPM) of an engine of the agricultural machine do not exceed a predetermined RPM within a predetermined time period after the ignition has been controlled to be turned on;

a second condition in which a temperature of the engine does not exceed a predetermined temperature within a predetermined time period after the ignition has been controlled to be turned on; and

a third condition in which a person is not seated in a
driver's seat within a predetermined time period after
the ignition has been controlled to be turned on.

7. A non-transitory computer-readable storage medium
comprising a computer program recorded thereon, the com-
puter program being executed to perform a method com-
prising:

receiving an update request message including a plurality
of new startup conditions and a plurality of new shut-
down conditions from a server;

updating a plurality of startup conditions and a plurality of
shutdown conditions based on the update request mes-
sage;

receiving a startup request message for an agricultural
machine from the server;

monitoring whether the plurality of updated startup con-
ditions for each part of the agricultural machine are
satisfied;

controlling an ignition of the agricultural machine to be
turned on when all the plurality of updated startup
conditions are satisfied;

transmitting an ignition completion message to the server;

14 monitoring whether at least one of a plurality of updated
shutdown conditions for each part of the agricultural
machine is satisfied;

controlling the ignition of the agricultural machine to be
turned off when the at least one of the plurality of
updated shutdown conditions is satisfied; and transmitting a shutdown notification message to the
server, wherein the plurality of updated shutdown conditions
include:

a condition in which revolutions per minute (RPM) of
an engine of the agricultural machine do not exceed
a predetermined RPM within a predetermined time
period after the ignition has been controlled to be
turned on;

a condition in which a temperature of the engine does
not exceed a predetermined temperature within a
predetermined time period after the ignition has been
controlled to be turned on; and a condition in which a person is not seated in a driver's
seat within a predetermined time period after the
ignition has been controlled to be turned on.

* * * * *